G. W. DONNING.
TYPE WRITER.
APPLICATION FILED JUNE 23, 1903.
1,056,644.
Patented Mar. 18, 1913.
10 SHEETS—SHEET 4.
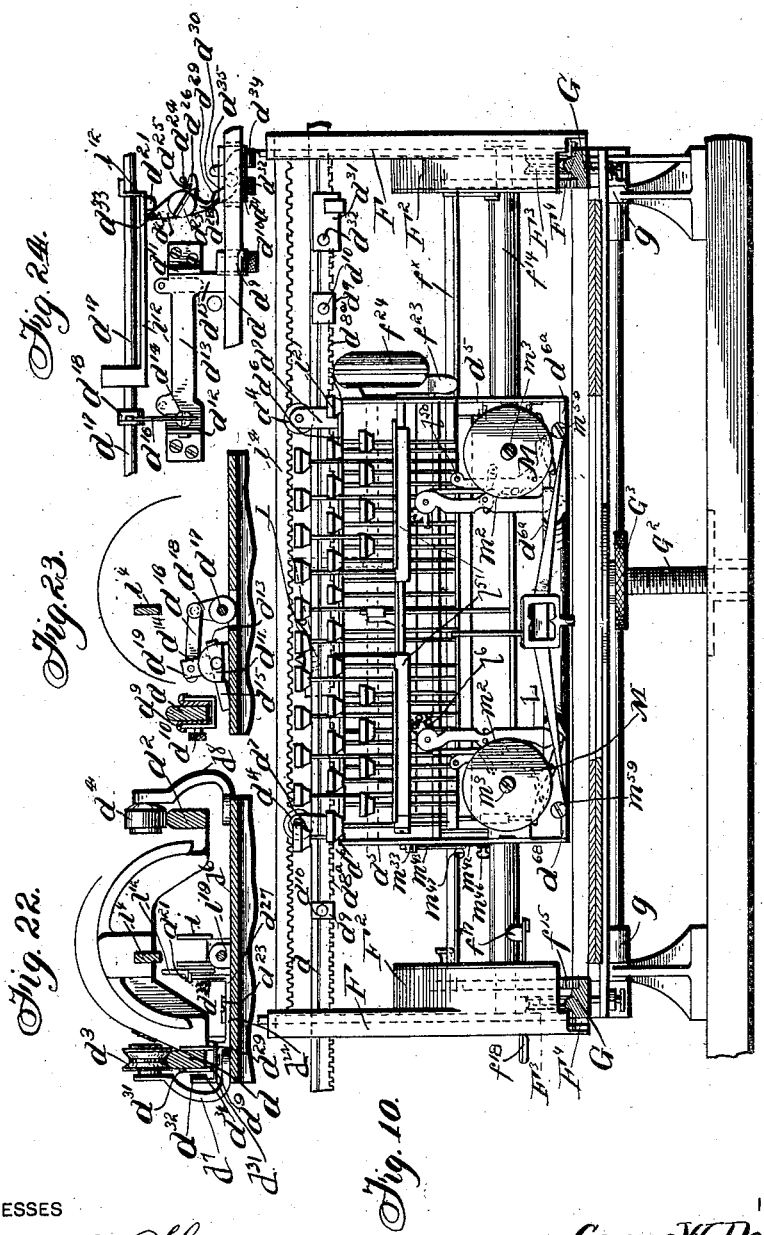
WITNESSES
Eugene M. Sliney
C. C. Cousins
INVENTOR:
George W. Donning,
by
R. S. Dyrenforth,
his attorney G. W. DONNING.
TYPE WRITER.
APPLICATION FILED JUNE 23, 1903.
1,056,644.
Patented Mar. 18, 1913.
10 SHEETS—SHEET 5.
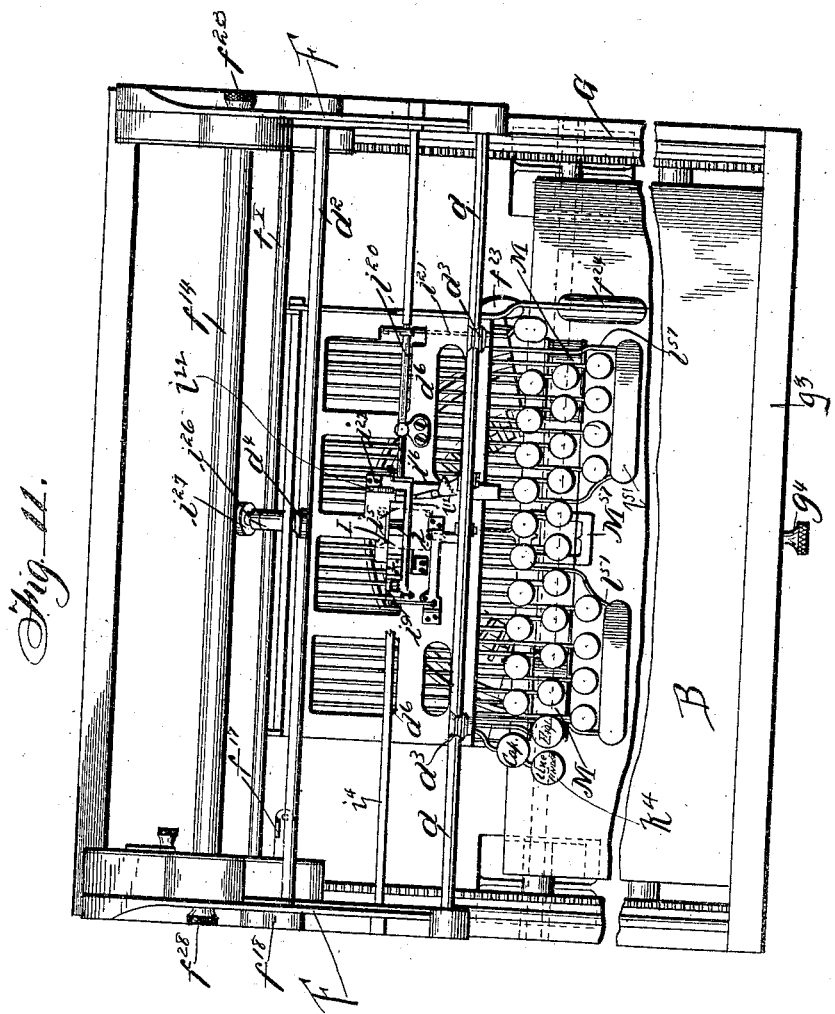
WITNESSES
INVENTOR:
George W. Donning,
by his attorney.

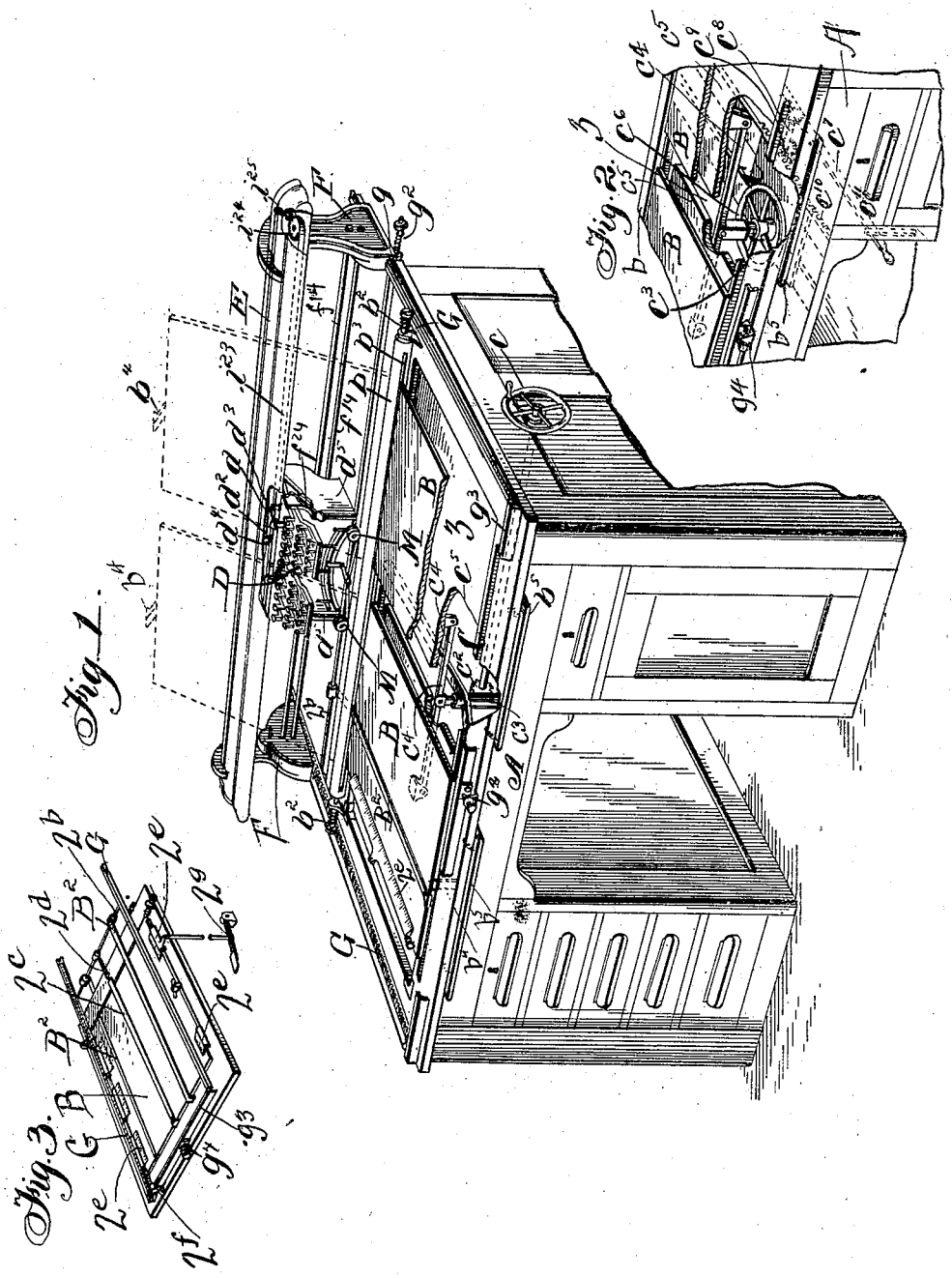

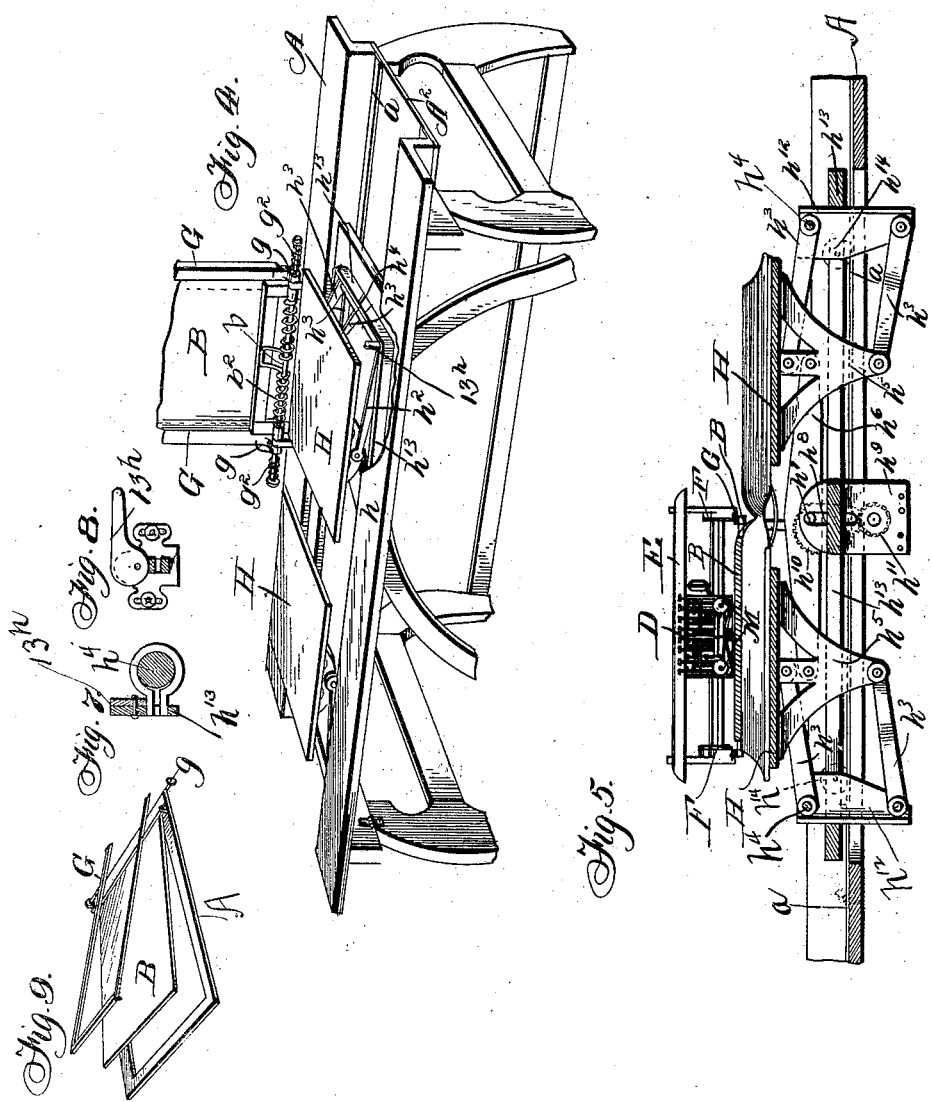

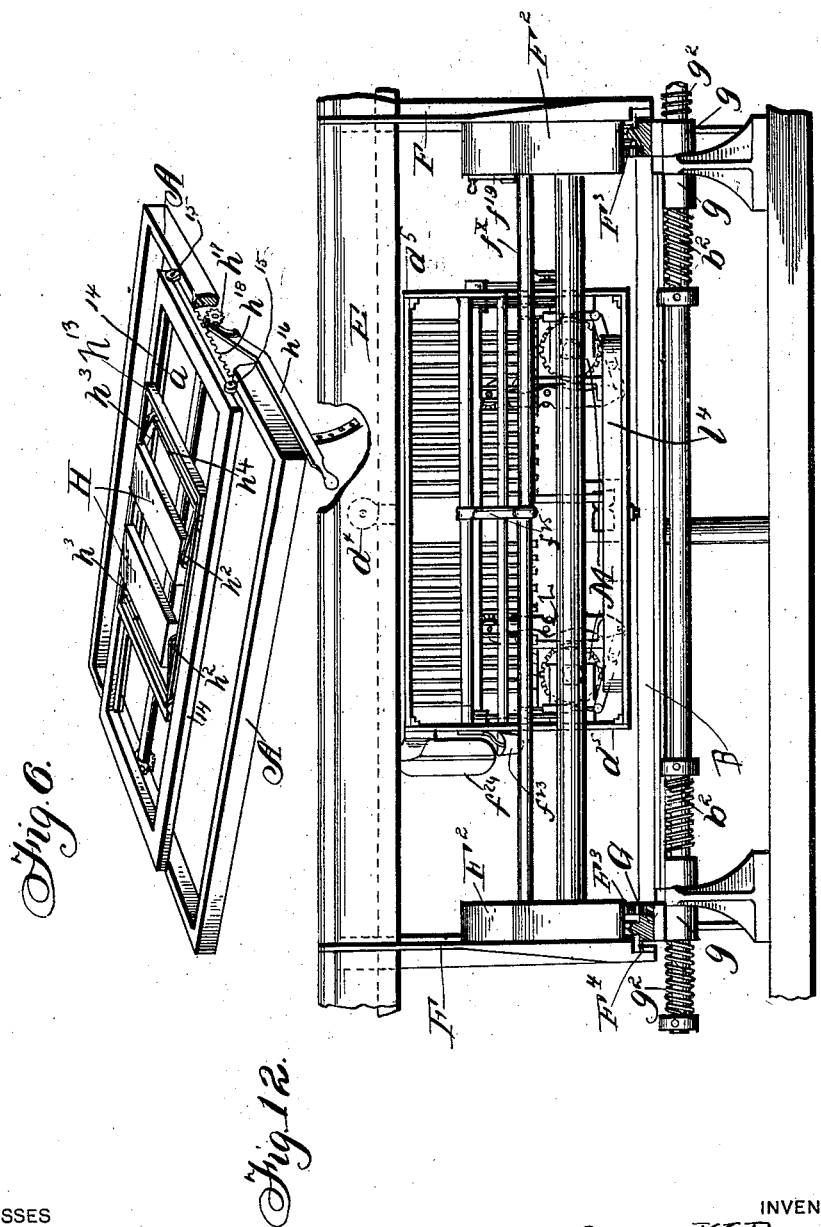

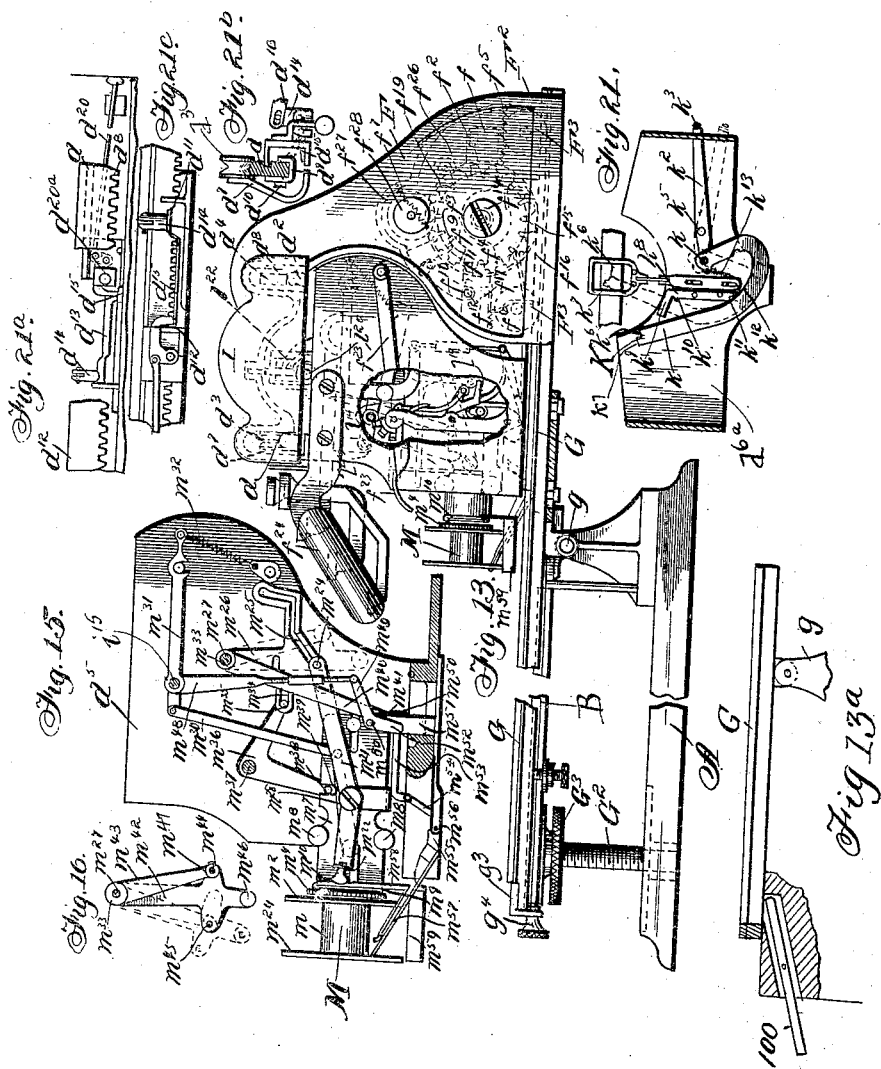

G. W. DONNING.
TYPE WRITER.
APPLICATION FILED JUNE 23, 1903.
1,056,644.
Patented Mar. 18, 1913.
10 SHEETS—SHEET 7.
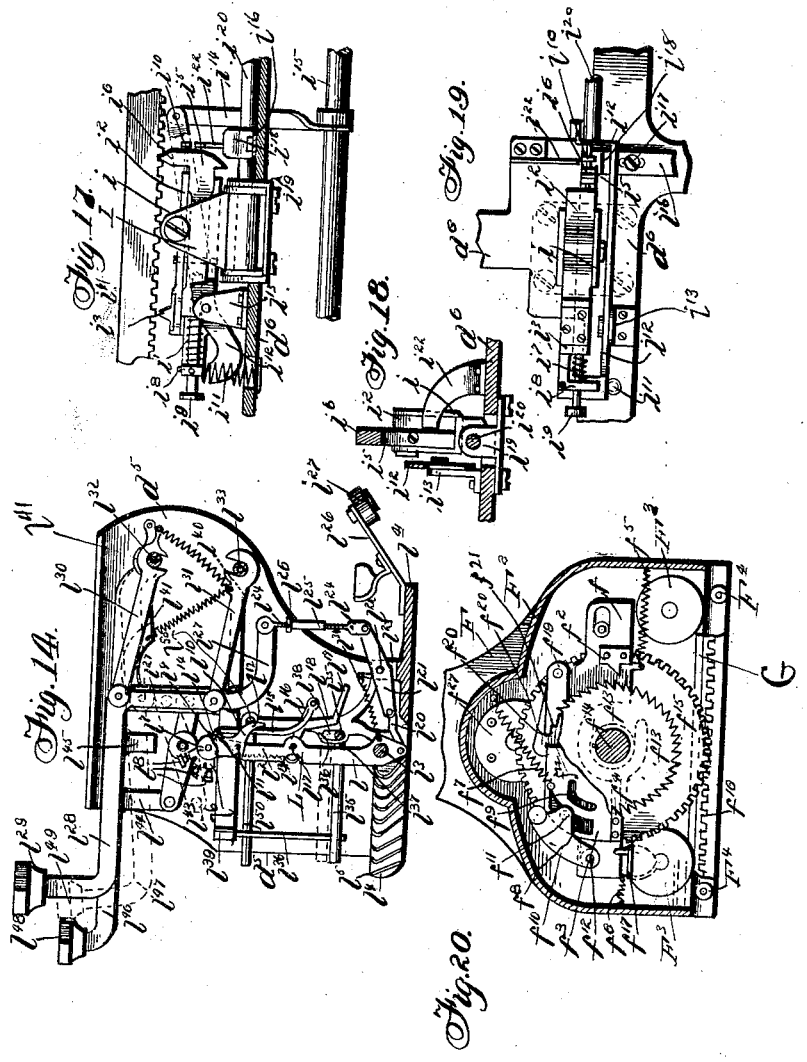
WITNESSES
Eugene W. Hiney
C. D. Cousins
INVENTOR:
George W. Donning,
by
R. S. Dyrenforth,
his attorney.

G. W. DONNING.
TYPE WRITER.
APPLICATION FILED JUNE 23, 1903.
1,056,644.
Patented Mar. 18, 1913.
10 SHEETS—SHEET 8.
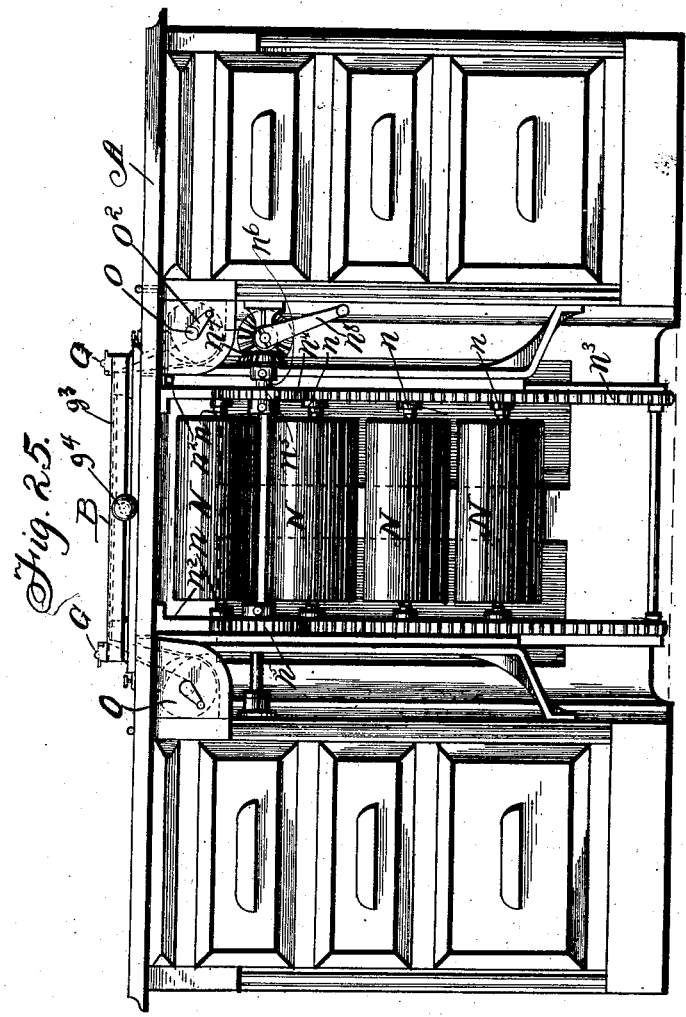
WITNESSES
Eugene M. Heney
C. L. Cousins
INVENTOR:
George W. Donning,
by R. S. Dyrenforth,
his attorney.

G. W. DONNING.
TYPE WRITER.
APPLICATION FILED JUNE 23, 1903.
1,056,644.
Patented Mar. 18, 1913.
10 SHEETS—SHEET 9.
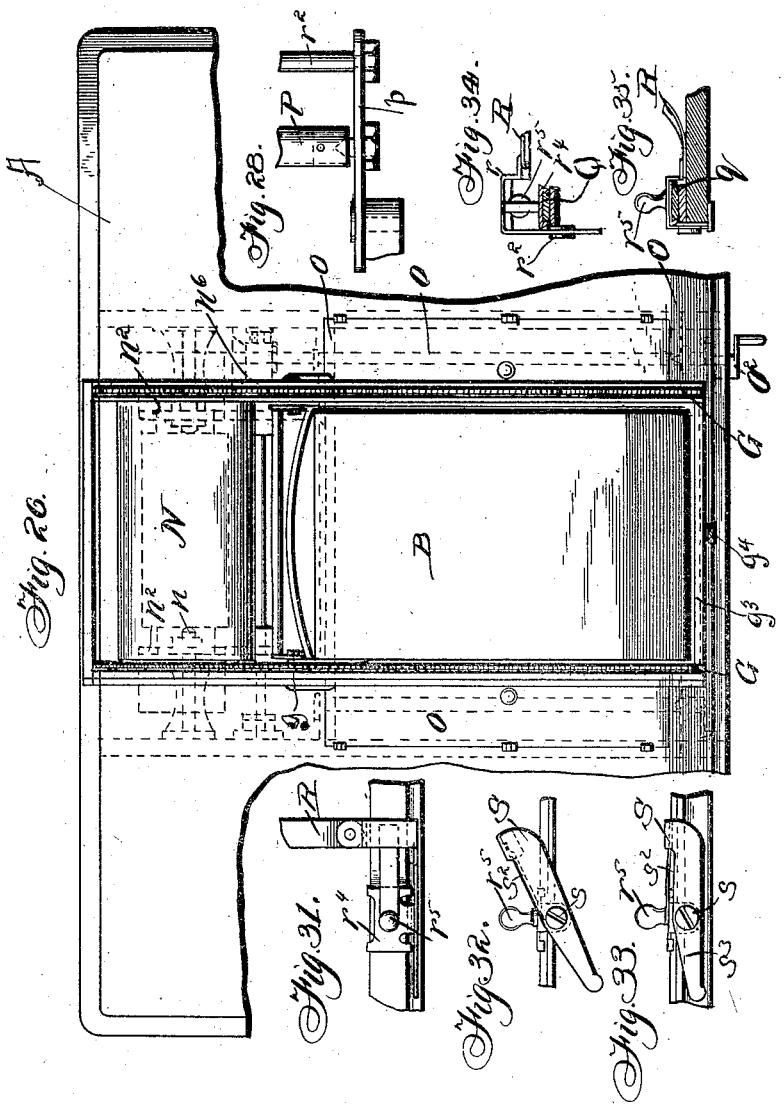
WITNESSES
Eugene W. Hiney
C. C. Cousins
INVENTOR:
George W. Donning,
by R. S. Dyrenforth,
his attorney.

G. W. DONNING.
TYPE WRITER.
APPLICATION FILED JUNE 23, 1903.
1,056,644.
Patented Mar. 18, 1913.
10 SHEETS—SHEET 10.
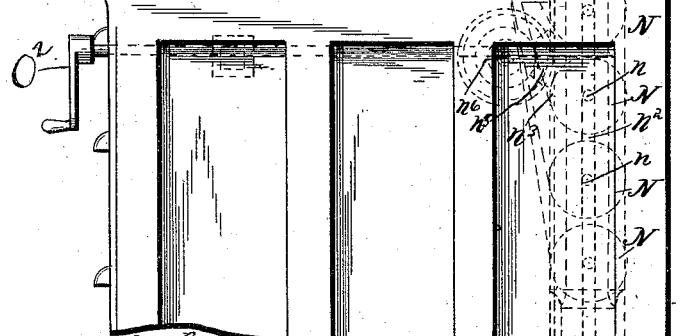

UNITED STATES PATENT OFFICE.

GEORGE W. DONNING, OF EAST ORANGE, NEW JERSEY, ASSIGNOR TO HARRY T. AMBROSE, OF ORANGE, NEW JERSEY.

TYPE-WRITER.

1,056,644.   Specification of Letters Patent.   Patented Mar. 18, 1913.

Application filed June 23, 1903. Serial No. 162,811.

*To all whom it may concern:*

Be it known that I, GEORGE W. DONNING, a citizen of the United States, residing at East Orange, in the county of Essex and State of New Jersey, have invented certain new and useful Improvements in Type-Writers; and I do hereby declare the following to be a full, clear, and exact description of the invention, such as will enable others skilled in the art to which it appertains to make and use the same.

This invention relates to typewriters, and more especially to that class of machines now known in the art as "flat-platen typewriters".

The several objects of the invention, the elements, mechanisms and structures which it comprises, and their operation and coöperation, will fully appear in the following:

In the accompanying drawings are illustrated preferred forms of mechanisms and devices constituting my complete invention Illustration of these particular forms is not to be understood as confining me to particular constructions, as other appropriate devices and mechanism may be substituted, and be within the spirit of my invention.

In these drawings:—Figure 1 is a perspective view of a desk, a platen, writing mechanism, and means for supporting and positioning these structures, and, also, of a book-support and mechanism for positioning it; Fig. 2 is a fragmentary view, in perspective, of a modified form of book-support positioning mechanism; Fig. 3 is a similar view showing various forms of clamps and work-holders for retaining the work-sheet, book-page, etc., on the platen; Fig. 4 is a view in perspective showing a self-adjusting and transversely-slidable book-support; Fig. 5 is a view of the same in front elevation; Fig. 6 is a perspective view of book-support movable longitudinally as well as transversely, and adjustable vertically; Figs. 7 and 8 show clutch-devices to lock the adjustable book-support in any of its adjusted positions; Fig. 9 is a perspective view of the platen and the tracks tilted away from normal position; Fig. 10 is a view in front elevation, showing the carriage for supporting the writing-mechanism and its operating-keys, the type-bars and their actuating mechanism, the ribbon-mechanism, and the carriage-support; Fig. 11 shows the same in plan; Fig. 12 shows the same in rear elevation; Fig. 13 shows same in side elevation, and, shows also, a track-adjusting-device; Fig. 13$^a$ is a detail view of the track-tilting mechanism; Fig. 14 is a view in elevation of a type-bar and its actuating mechanism; Fig. 15 is a similar view of the ribbon-mechanism; Fig. 16 is a detail view of a multi-color-ribbon-adjusting-mechanism; Figs. 17, 18, and 19 are detail views in front and end elevation, and in plan, respectively, of a letter-spacing-mechanism; Fig. 20 is a view in sectional elevation of a line-spacing mechanism; Fig. 21 is a view in bottom plan of a line-finder device; Figs. 21$^a$, 21$^b$, 21$^c$, 22, 23 and 24 are views of a tabulating-device, and, also, of an adjustable letter-spacing stop; Fig. 25 shows, in front elevation, webs of paper and carbon for manifolding; Fig. 26 is a view of the same in plan; Fig. 27 is a view of the same in side elevation; Fig. 28 is a detail view of a bearing for the web-holding spindle; and Figs. 29, 30, 31, 32, 33, 34 and 35 are views of devices for holding, raising and separating the writing-material and carbon, and a tape work-holder.

In the drawings, A designates a desk or table, any form of which may be used. Arranged over the top of the table are platens B, comprising one of more movable members or leaves, suitably hinged on a spindle $b$ held under pressure by a spring $b^2$ and which effects an automatic tilting or lifting thereof. The spindle $b$ is provided with a slot $b^3$ in which an end of the platen is loosely mounted to permit adjustment of the platen. To hold the platen in its lowest or operative position, it is provided with lock $b^4$ that may be unlocked by a rod or bar $b^5$.

In Fig. 3 are shown various forms of work-holders or paper-retaining devices: These may be the track-frame G resting on the platen; or a tape B$^2$ held at the rear by a rod 2$^b$ and held at the forward end by hooking over the front of the platen; or a tape 2$^c$ hooking over the front of the platen and connected to the rear rod $2^b$ by a spring $2^d$; or clamp-devices $2^e$ disposed at the sides of platen and operated by a hand-lever $2^f$ or by a foot-lever $2^g$. In Fig. 1 the clamp-device is shown as graduated. These work-holders bear with more or less pressure against the platen and thereby confine the paper or carbon thereon.

The book-support 3 which underlies the platen, may be elevated vertically, as by the mechanism C (Figs. 1 and 2) operated by a wheel $c$ (Fig. 1) carrying a pinion $c^2$ that meshes with a rack (not shown) and which is carried on the rear face of a spindle $c^3$ that supports a rocking-bar $c^4$, carrying a leaf $c^5$ disposed under the platen. The rocking-bar $c^4$ may connect directly with the book-support-leaf $c^5$, if desirable.

Fig. 2 shows a modified form of mechanism: In full lines is illustrated a hand-wheel $c^6$ arranged directly on a screw-threaded spindle $c^3$ which, when turned, raises or lowers the device.

To effect longitudinal adjustment of the book-support, I provide a lever $c^7$ (Fig. 2) pivoted at its rear end and operating a shaft $c^8$ on which is mounted a pinion $c^9$ that meshes with a rack-bar $c^{10}$ carried by parts of the support. I also provide toward the end of the handle of the lever $c^7$, a device for retaining the lever in any of its adjusted positions, and which comprises a plate $c^{11}$ against which the handle may temporarily be held.

The platen is, by the construction and arrangement set forth, capable of being tilted on its rear pivot after releasing its locking-mechanism, and, also, of being shifted transversely on its hinge $b$, in the slot $b^3$.

The book-support is arranged for vertical adjustment by the hand-wheel $c$, (Fig. 1), or by the hand-wheel $c^6$ (Fig. 2); also, for longitudinal-adjustment by the lever $c^7$, and, also, for transverse shifting, as shown in Fig. 4; and as more fully described hereinafter.

The writing mechanism or carriage D is movable in any direction relative to the platen: This carriage is disposed on the transverse support E, and comprises, preferably, rails $d$, $d^2$, upon which travel rollers $d^3$, $d^4$, and from which the carriage D is suspended.

The transverse support E is supported on two side-brackets F; these house the line-spacing mechanism hereinafter described, and said support E and brackets F form the line-space carriage. The brackets F travel on tracks G disposed at each side of the platen. Fig. 10 shows, on an enlarged scale, the form of these tracks, which consist of a body-portion provided with a projecting flange at its outer side, a round rib on the upper surface, and an inwardly-extending flange on the inner edge. The last-mentioned flange is formed with a rack-surface. These tracks G may, as shown in Figs. 3, 4 and 9, rest upon the platen, or, as shown in Figs. 1 and 5, be independent thereof, and may be stationary. In the drawings, the tracks are shown as hinged, preferably, at $g$. Springs $g^2$ for raising the tracks automatically are disposed at the hinge $g$, one end of the spring being secured to the hinge-member $g$, and the other operating upon the track. A suitable locking device $g^4$ at the front of the tracks may be employed to hold them down in normal position. The rails may, as shown in Figs. 1 and 13, extend beyond the hinges, so that, when the brackets F move beyond the hinge, the tracks, by reason of the attending shifting of the weight thereon beyond the hinges, will rise at their forward ends automatically. Levers 100 (Fig. 13$^a$), for tilting the tracks by being suitably fulcrumed so as to engage the tracks and lift their forward ends upwardly may also be employed. The platen may also have a spring $b^2$ at its hinge to raise it automatically, (Figs. 1 and 4).

The tracks G are, preferably, connected by a transverse piece $g^3$, and this and the two track-members constitute a frame.

In the structure shown in Figs. 1 and 13, provision is made for slightly moving the tracks longitudinally to bring the writing-mechanism to a point between the regular lines of line-spacing. An adjusting and track-locking device $g^4$ is preferably located centrally of the transverse piece $g^3$ (Fig. 1), and comprises a threaded thumb-screw connecting with the transverse piece $g^3$, and is of a construction that permits raising of the track-frame. The tracks, at their hinge-point, are constructed to permit longitudinal movement, on the hinge $g$ (Fig. 13), as disclosed in detail in my Letters-Patent No. 929840, Aug. 3, 1909. The platen may also be made to permit slight longitudinal adjustment as disclosed in detail in my Letters-Patent, No. 753,190, February 23rd, 1904.

Figs. 4, 5 and 6 show my laterally-shiftable and adjustable book-support, arranged below the platen, and comprising leaves H supported on end-brackets $h$ pivotally connecting with single front arms $h^2$, and with parallel rear arms $h^3$. The arm $h^2$ and the upper arm $h^3$ are connected by a rod $h^4$ to afford unison of action. The front brackets $h$ are somewhat smaller than the rear brackets $h^5$. Connecting with the brackets $h^5$ is a rocker-arm $h^6$ carrying a lug $h^7$ that slides in a slot $h^8$ in plate $h^9$ that supports a cam-plate $h^{10}$ meshing with a pinion $h^{11}$. This constitutes an evener-device. By this mechanism, when one leaf H is depressed, as by the weight of the book, the opposite leaf is raised or evened through the interposed mechanism, consisting of arms $h^2$, $h^3$, brackets $h$ and $h^5$, rocking-arm $h^6$, and cam-plate $h^{10}$ and pinion $h^{11}$. The extending ends of arms $h^2$ and $h^3$ are supported in brackets $h^{12}$ carried by a rectangular frame $h^{13}$ provided with wheels $h^{14}$, (Fig. 5) running on tracks $a$. To lock the book-support in position when adjusted, I provide clutch-devices $13^h$ at the pivotal point of the arm $h^3$, (Fig. 4), the preferred forms appearing in detail in Figs. 7 and 8.

To adjust the book-support for a different sized book (that is a book of different thickness), cam-plate $h^{10}$ is turned, as by the screw connecting therewith, at its rear and not shown, and this raises or lowers the lug $h^7$ in slot $h^8$, thereby raising or lowering rocker-arm $h^6$ to a higher or lower plane, and this swings the bracket up or down to raise or lower the leaves H. The teeth in cam-plate $h^{10}$ and pinion $h^{11}$ are so formed as to lock and hold the parts in place, temporarily, as described in my Patent No. 826,482, July 17th, 1906. Once set, the device may be used for a particular sized book without further adjustment.

Herein, I have disclosed a book-rest or support which is, first, adjustable to different sized books; secondly, automatically adjustable and capable of yielding as one side of the book thickens in progress of work; third, slidable under the platen.

Fig. 6 illustrates a book-support which is movable both transversely and longitudinally, the transversely movable portion being the same as appears in Fig. 4. This is supported on a rectangular frame 14 traveling on the table-top A on rollers 15. A lever $h^{16}$ operates a pinion $h^{17}$ meshing with a rack-plate $h^{18}$, and effects longitudinal front-to-rear movement of the frame 14.

The sliding book-support is particularly useful where the writing-mechanism is utilized for typing in books. It holds the book-leaf in such position as to be readily and conveniently disposed across the platen (Fig. 5), and, as each page of the book is turned to bring new writing-surface into play, the device, because of its peculiar construction, acts automatically to position the respective sides of the book.

The writing-mechanism D, suspended on the rails $d$, $d^2$, is disposed within a carriage which comprises side-plates $d^5$, $d^5$, a top-plate $d^6$, and a bottom or fulcrum-plate $d^{6a}$ (Fig. 10). On the top-plate are brackets $d^7$, $d^7$, $d^8$, $d^8$, carrying the rollers $d^3$, $d^4$, respectively, which travel on the rails $d$, $d^2$. These rails have their tread round. The rollers $d^3$ are of the concave, flanged style, while the rollers $d^4$ are provided with flat peripheries. These constructions prevent friction, effect a cleaning of the tracks, and prevent binding of the parts. Carried by the top-plate $d^6$ of the carriage just described, is a letter-spacing mechanism I (Figs. 11, 17, 18 and 19) consisting of a trunnion-yoke $i$ which supports a rocker-bar $i^2$ provided with a rigid-dog $i^3$ that operates in a rack-bar $i^4$ above the top-plate $d^6$ and extending transversely from the side brackets F. In a depression in the rocker-bar $i^2$ slides a plate $i^5$ carrying a "loose"-dog $i^6$. The sliding-plate $i^5$ operates by a spiral spring $i^7$ at its rear and abuts against an arm $i^8$ carried by the rocker-bar $i^2$. Limit-devices $i^9$, $i^{10}$, restrict the extent of movement of the sliding-plate $i^5$.

To maintain the "loose"-dog normally in contact with the rack-bar $i^4$, a tension spring $i^{11}$ is disposed on the arm $i^8$, and connects, at its other end, with the top-plate $d^6$. To effect rocking of the rocker-bar $i^2$, a rocking lever $i^{12}$ is mounted contiguous to the rocker-bar $i^2$ and contacts with the arm $i^8$ thereon. This rocking-lever is supported on the bracket $i^{13}$ (Fig. 17), and connects with a vertical rod $i^{14}$. Movement of the universal bar $i^{15}$, by operation of the key-levers, etc., effects retraction of rod $i^{14}$, and rocks the lever $i^{12}$ which, by striking the arm $i^8$, raises the rocker-bar $i^2$ to throw the rigid dog $i^3$ into contact with the rack-bar $i^4$, and moves the "loose"-dog $i^6$ out of contact with the rack-bar to permit the carriage to move one point, when the "loose"-dog will again engage the rack-plate, and the rigid-dog $i^3$ will be rocked out of engagement therewith. To restrict the movement of the "loose"-dog on the slidable plate $i^5$, the upper face of the top-plate $d^6$ carries a slide-plate $i^{16}$, held by screw $i^{17}$, and having an upwardly-projecting portion $i^{18}$, and against which the "loose"-dog $i^6$ strikes under ordinary operation. When the slide-plate $i^{16}$ is retracted, however, the sliding-plate $i^5$ will move beyond its usual position, and, in this way, moves over two teeth in the rack-bar $i^4$, instead of one as before, and the carriage is permitted to escape two spaces instead of one.

The trunnion-block or yoke $i$ is pivoted in a bracket $i^{19}$ on a shaft $i^{20}$ which extends to the right of the letter-spacing mechanism I, and connects with a key-lever $i^{21}$. The turning of the shaft $i^{20}$ actuates the trunnion-block $i$ and throws the rigid and loose dogs both out of engagement with rack-bar $i^4$, whereby general transverse release of the carriage is effected. To hold the loose dog $i^6$ in position, when trunnion-block $i$ is thus tilted, I provide, on the top-plate $d^6$, a guide-bracket $i^{22}$, which, when the trunnion block is being returned to position, guides the loose dog $i^6$ into its position to take against teeth in the rack-bar $i^4$, (Fig. 17).

The particular form of letter-space mechanism herein shown constitutes the subject-matter of my United States Patent No. 840,203, January 1st, 1907, and I do not, therefore, specifically claim the same herein, but only said mechanism as an element in the combination of the typewriting-machine constituting the subject-matter of the present application.

To draw the letter-space carriage-frame from left to right and against the action of the letter-spacing mechanism a steel tape $i^{23}$ (Fig. 1) is secured to the carriage and winds, at its other end, upon a spool $i^{24}$ disposed on one of the side brackets F and provided with a tape-tensioning-device $i^{25}$. To steady the carriage in its transverse movement, I attach to the base-plate, a central bracket $i^{26}$ carrying a roller $i^{27}$ (Figs. 11 and 14) bearing upon a shaft $f^{14}$ extending transversely across the carriage. Figs. 10, 21$^a$, 21$^b$, 21$^c$, 22, 23 and 24 illustrate, in connection with said letter-spacing mechanism, devices for temporarily stopping the transverse or letter-spacing movement of the carriage, for tabulating, and for marginal stopping, and, also, locking-and-releasing mechanism to stop and lock the carriage, at the end of a line. Fig. 10 shows the lower edge $d^{8a}$ of front rail $d$ toothed, in which engage teeth of movable tabulator-stops $d^9$, each provided with a thumb-screw $d^{10}$. The marginal stop $d^{31}$ is also illustrated in Figs. 10 and 24, and a description thereof follows hereinafter.

On the top-plate $d^6$ of the letter-space carriage are secured two brackets $d^{11}$, $d^{12}$, and pivoted between these is a rocking-plate $d^{13}$ provided with a vertical stud $d^{14}$ at one end, and a horizontal extension $d^{15}$ at other end, the former connecting with a slotted link $d^{16}$ which, in turn, connects with an arm $d^{18}$, and this connects with a transverse release-shaft $d^{17}$. The horizontal extension $d^{15}$ is designed to abut against the rear ends of the tabulating stops $d^9$ (as in Fig. 24) whenever one of these is positioned in its path. During ordinary step-by-step movement of the carriage, the extension $d^{15}$ is, normally, below the plane of the lower edge of the stop $d^9$ (as in Fig. 23); but when the release-shaft $d^{17}$ is operated in moving the carriage from left to right, the arm $d^{18}$ is moved to retract link $d^{16}$, and this rocks the plate $d^{13}$ and raises extension $d^{15}$ to abut against the stop $d^9$ to arrest movement of the carriage at that point for tabulating, say, a series of figures. When, however, full general-release is necessary, the rocking-plate $d^{13}$ is operated to depress the extension $d^{15}$ below the lower edge of the stop $d^9$, and in doing this, lever $i^{20}$, (Fig. 11, supported and fulcrumed on and extending to right of the carriage, above top-plate $d^6$) is operated to cause a movable depending toe (not shown) to bear against and depress extension $d^{15}$ and hold it until the pressure thereon is relieved, whereupon the extension will abut against the next tabulating stop, if there be one.

Figs. 22 and 24 illustrate a double, automatically-operated, and adjustable carriage-stopping-and-locking device which operates in conjunction with the letter-spacing mechanism, already described, and includes the rocker-bar arm $i^{12}$, aforementioned, having a projecting ear $d^{21}$ which coöperates with a swinging automatic-escapement lock-lever $d^{22}$, consisting of three prongs (Fig. 24) and pivoted to top carriage-plate $d^6$ by screw $d^{23}$ for a swinging movement to the post $d^{24}$. A spring $d^{25}$ holds the prong $d^{26}$ against the post to maintain the prong $d^{27}$ normally out of engagement with rocker-arm $i^{12}$ until the third prong $d^{28}$ abuts against a projection $d^{29}$ of the pivoted releasing-member $d^{30}$ carried by the marginal stop $d^{31}$ that is adjustably secured upon the front rail $d$, as by thumb-screw $d^{32}$. By this movement, the swinging lever $d^{22}$ is moved on its pivot $d^{23}$ to throw its upturned end $d^{33}$ under the ear $d^{21}$ of the rocker-arm $i^{12}$, which then prevents further rocking of said arm $i^{12}$ and locks the letter-spacing-mechanism against further operation. This effects a locking of the carriage at that point, and, by locking the universal-bar $i^{15}$ (hereinafter described) prevents operation of the type-bars. To permit the carriage to advance a few more spaces, in order to complete a word; say the releasing-lever $d^{30}$ is moved, as by thumb-piece $d^{34}$, which disengages its projection $d^{29}$ from the prong $d^{28}$, whereupon, the spring-actuated swinging lever $d^{22}$ again abuts against the post $d^{24}$. This withdraws the upturned end $d^{33}$ from under the ear $d^{21}$ and permits further movement of the carriage until the prong $d^{28}$ abuts against a second projection $d^{35}$ of the releasing-lever $d^{30}$, causing the swinging lever $d^{22}$ to project its end $d^{33}$ under the ear $d^{21}$ of the rocker-bar $i^{12}$, whereupon the carriage is again stopped and locked as before, and, likewise, all other mechanism operating from the universal bar $i^{15}$. This marginal stop and its adjunctive mechanism is more particularly described and claimed in my United States Patent, No. 742,611, October 27th, 1903 and, therefore, I do not herein claim the same specifically but only as an element in the combination of the typewriting-machine constituting the subject-matter of my present application.

Fig. 10, (in dotted lines), Fig. 13 (also in dotted lines), and Fig. 20, (in full lines) illustrate a preferred form of line spacing mechanism that is carried on side-brackets F in housing F$^2$, wherein is disposed a rigid dog-plate $f$ carrying a rigid-dog $f^2$, a loose dog-plate $f^3$ carrying a loose-dog $f^4$, the rigid and loose dog-plates sliding upon each other and maintained in operative position by springs $f^5$, $f^6$, $f^7$. The loose dog-plate $f^3$ has a reciprocating movement (see Fig. 20), and is provided with slots $f^8$, $f^9$, and a tripper $f^{10}$ carrying a pin $f^{11}$ that works in the slot $f^8$ and effecting reciprocation of the loose dog-plate $f^3$. The tripper $f^{10}$ is pivoted at $f^{12}$. In front of the rigid and loose dog-plates is a ratchet-wheel $f^{13}$ that is engaged by the loose and rigid dogs $f^2$ and $f^4$. This ratchet-wheel $f^{13}$ is rigidly keyed to and turns with the shaft $f^{14}$ that extends transversely of the machine and carries, contiguous to the ratchet-wheel $f^{13}$, a toothed wheel $f^{15}$ engaging rack-plate $f^{16}$ formed in track G. This mechanism is duplicated on the opposite side of the machine. To operate the line-spacing mechanism automatically, a lever $f^{17}$ pivoted within and projecting through the housing $F^2$ is engaged by the letter-space carriage when it is moved over to the left-hand side, and operates the tripper $f^{10}$. To operate this tripper by hand, a lever $f^{18}$ is provided on the opposite side of the housing (Fig. 10). The engagement of the carriage against the lever $f^{17}$ operates the tripper $f^{10}$, and operation of this tripper actuates the loose dog-plate to disengage its dog from the ratchet-wheel $f^{13}$. This draws the rigid dog, on plate $f$, into engagement with the ratchet-wheel which, during disengagement therewith of the rigid dog and engagement therewith of the loose dog, turns one tooth to turn the shaft $f^{14}$ (to which it is secured), and under the action of the carriage propelling spring (not shown) this turns the gear-wheel $f^{15}$, which meshes in the rack $f^{16}$, and allows movement of the bracket F on each side to advance the line-space carriage and the writing-mechanism one line. To effect double spacing of this mechanism, an offset regulator $f^{19}$ (Figs. 12 and 20), is utilized to permit a longer movement of the loose dog, the regulator being provided with two abutting edges $f^{20}$ and $f^{21}$, against either of which the face $f^{22}$ of the loose dog-plate strikes, respectively, for single or double line-spacing. To effect general release of this mechanism, a lever $f^{23}$ (Fig. 10), disposed near the carriage-handle $f^{24}$, is provided, and carries a depending arm $f^{25}$ (Fig. 12) for engaging the transverse shaft $f^x$ extending from opposite side-plates F, and engaging with the tripper $f^{10}$ already described.

Each side bracket carries rollers $F^2$, $F^3$ (Figs. 10, 13 and 20) traversing the ribs on the upper face of the track-rails G, and rollers $F^4$ traveling under flanges of the track rails G.

Disposed back of the toothed wheel $f^{15}$ is a clock-spring, (not shown) connecting at one end with the shaft $f^{14}$ and at the other end with a disk (not shown) encompassing shaft $f^{14}$ and coacting with a pinion $f^{27}$. Rotation, as by a thumb-knob $f^{28}$, of the pinion $f^{27}$ causes a tensioning of the spring. The power of the spring is utilized to propel the carriage-frame F, which is held against movement (except intermittingly) by the line-spacing-escapement-mechanism already described.

The particular form of line-space mechanism herein shown is fully disclosed and claimed in my United States Patent No. 826,483, July 17th, 1906, and I do not therefore claim it specifically herein but only as one element in the combination of the typewriting-machine constituting the subject-matter of the present application.

Fig. 21 illustrates a line-finder, preferably fulcrumed beneath the writing-mechanism, on a base-plate $d^{6a}$, and consisting of plate K pivoted at $k$, and operated by a lever $k^2$ connecting with a second lever $k^3$ (the end of which appears in Fig. 21) terminating in key $k^4$ (Fig. 11) arranged in the key-basket. Lever $k^2$ is pivoted at $k^5$ and, upon being moved to the position indicated in dotted lines, thrusts the plate K into the position shown in dotted lines, and brings the indented end $k^6$ to the printing point. This indent $k^6$ shows the exact position of a letter, while the straight edge $k^7$ being in the plane of the bottom of a letter in the printing line shows the position of a line. When the plate K is thrust downward, it contacts with a cam-plate $k^8$ secured to the base-plate of the machine and having a projecting end $k^9$ against which the plate K moves and by which it is depressed to the platen-level. The plate $k^8$ is provided with a lug $k^{10}$ against which the plate K abuts to limit its movement. The rear end of the plate $k^8$ is provided with a shoulder $k^{11}$, against which the plate K moves and by which it is guided into position by reason of its bearing-surface $k^{12}$. A spring $k^{13}$ is provided on the inner end of the plate K to withdraw it.

The particular form of line-finder herein shown is the subject matter of my United States Patent No. 745,095, November 24th, 1905, and I do not therefore claim the same herein, specifically, but only as an element in the combination of the typewriting-machine constituting the subject-matter of my present application.

Figs. 10, 12, 13 and 14 illustrate the type-bars and type-heads, and their actuating mechanisms: L designates a type-bar (Fig. 14), preferably of U-shaped metal, bent together at the lower portion $l$ to constitute a solid, rigid structure, while the upper portion $l^2$ constitutes a housing for a pawl-operating spring, hereafter described. Each type-bar is pivoted on a fulcrum wire $l^3$ extending through a slot in the fulcrum or base-plate $l^4$ in one piece, said base-plate being provided with recesses $l^5$ to receive and guide the lower portion of the type-bar L. The type-bar carries a movable head $l^6$, the cheeks of this type-bar $l^7$ forming bearing-guides for the same. The head carries preferably three types $l^8$. Its rear periphery is provided with serrations (not shown), in which engages a beak $l^9$ of a pawl $l^{10}$ pivoted on the type-bar at $l^{11}$, and having a depending projecting end $l^{12}$. The pawl is held in operative position by a spiral spring $l^{13}$ disposed in the housing in the upper portion $l^2$ of the bar. The head $l^6$ has a rearwardly projecting end $l^{14}$, with which connects a link $l^{15}$ extending downward to the rear of the type-bar and connecting at its lower end with a rocking-arm $l^{16}$ pivoted at $l^{17}$ about centrally of the type-bar. The spring $l^{13}$ maintains the pawl $l^{10}$ against the serrations in the type-head and also operates the rocking-arm $l^{16}$. From the rocking arm $l^{16}$ depends an extension $l^{18}$ carrying a tail-piece $l^{19}$. Toward the extreme lower end of the type-bar L is pivoted a link $l^{20}$ which connects with a rocking-lever $l^{21}$ pivoted preferably, centrally, at $l^{22}$ on the lug or projection $l^{23}$, extending upward from the face of the fulcrum-plate $l^4$. To the opposite end of the rocking-lever is pivoted a link $l^{24}$, provided with a turn-buckle $l^{25}$ and a locking-nut $l^{26}$ for adjustment and for taking up lost-motion. Connecting with this link $l^{24}$ is a lever $l^{27}$, extending upward and, then, at right-angles, to constitute a key-lever $l^{28}$ carrying a key-button $l^{29}$ positioned in the key-basket. To hold the key-lever in position, parallel-links $l^{30}$, $l^{31}$, are provided, these being pivoted on a transverse bearing $l^{32}$, $l^{33}$. When the key-lever $l^{28}$ is depressed, the parallel-links $l^{30}$, $l^{31}$ are moved downwardly, though in a manner to permit the button $l^{29}$ to descend approximately in a vertical line, thereby producing an easy and even touch. Depression of the key-lever $l^{28}$ and its connecting-link $l^{24}$ causes the rocking of the lever $l^{21}$, effecting movement of the link $l^{20}$, and this, in turn, pulls the lower end of the type-bar to swing it toward the printing-surface. To effect an accelerated return of the type-bar, a spring $l^{34}$ is connected at one end with the lower end of a type-bar and, at the other end, with a pin on the base-plate $d^6$. The employment of these parts, and the particular relative position of the fulcrum-points of the lower end of the link $l^{24}$, of the rocking lever $l^{21}$, and of the lower end of the type-bar, produces a toggle-joint, which operates to effect a rapid return of the type-bar, and also locks the type-bar when in its normal upright position. This toggle-joint device produces a uniformity of touch and impact, and gives greater power to start the descent of the type-bar, and produces greater speed toward the finish of the descent, and quicker speed in ascent. To provide mechanism for presenting any of the three type on the type-head, the link $l^{15}$, rocking-arm $l^{16}$, tail-piece $l^{19}$, and the locking-pawl $l^{10}$, are utilized. To actuate the type-head, a shifting semi-ring bar $l^{35}$ is disposed at the rear of the type-bars, and is supported on hangers $l^{36}$ provided with an enlargement $l^{37}$, having a slot $l^{38}$, in which the semi-ring bar $l^{35}$ is reciprocated and guided vertically. The hangers $l^{36}$ are carried, at their upper portion, by a plate $l^{39}$, suspended on parallel links $l^{40}$, $l^{41}$, connecting bell-crank-levers $l^{42}$, $l^{43}$, suitably pivoted and operated by pieces $l^{44}$, $l^{45}$, carried on levers, respectively, $l^{46}$, $l^{47}$, provided with key-buttons $l^{48}$, $l^{49}$. When the key $l^{48}$ is depressed to effect movement of the lever $l^{46}$, for positioning (for instance) a capital-letter carried by the type-head, the projection $l^{44}$ bears against the bell-crank-lever $l^{42}$. This raises the parallel links $l^{40}$, $l^{41}$, to lift the plate $l^{39}$, and this actuates the shifter-bar $l^{35}$ to second position. When the type-bar is caused to print, the tail-piece $l^{19}$ contacts with the shifter-bar and, as this piece rides upon and over said shifter-bar, the rocking-arm $l^{16}$ is raised. This forces the link $l^{15}$ upwardly, and moves the type-head to a position where the locking-pawl $l^{10}$ will engage the second tooth to lock the head against movement until it reaches the printing-point and returns to normal position, at which point the pawl $l^{10}$ strikes against a buffer or bar $l^{50}$ disposed to the rear of the type-bars, and contiguous to the projections $l^{12}$ of the locking pawl $l^{10}$. The buffer disengages the pawl from the teeth or serrations in the type-head, permitting the type-head to resume its normal position. To position the third or figure-character of the type-head, lever $l^{47}$ is depressed to cause the lug $l^{45}$ to bear upon the bell-crank-lever $l^{43}$ and this, with its interposed mechanism, effects a raising of the shifter-bar $l^{35}$ to the third position, at which point the tail-piece $l^{19}$ will raise the rocker-arm $l^{16}$ and the link $l^{15}$ and cause the type-head to move to third position. Normally, when the locking-pawl $e^{10}$ is in engagement with the buffer $l^{50}$, the locking-pawl is out of engagement with the teeth in type-head, (see Fig. 14), and remains so until the projection $l^{12}$ on the pawl is moved away from the buffer $l^{50}$, whereupon it engages the first tooth in the type-head and remains there until the tail-piece carried by the rocking-arm $l^{16}$ effects a movement of the head to position it for the second or the third character.

The particular form of type-bar and its actuating mechanism, herein described, constitute the subject-matter of United States Patents No. 745,095, November 24th, 1903, and No. 840,122, January 1st, 1907, and I therefore make no claim, specifically to the same herein, but only to said devices as elements in the combination or entity of the typewriting-machine constituting the subject matter of the present application.

The keys are arranged, preferably, in three banks, (Figs. 10 and 11). Each keylever, as usual, bears on the universal bar $i^{15}$, as does the spacer-key $l^{51}$. When any lever is depressed, the universal bar is operated to actuate the letter-spacing-mechanism, etc., in the well known manner.

Figs. 10, 12, 13 and 15 illustrate a ribbon-mechanism disposed upon the side-plate $d^5$ and by which the ribbon-spools M are operated, which spools carry a single ribbon of one or more colors, or a plurality of ribbons of the same color or of different colors. The particular form of ribbon device and its actuating mechanism, herein shown, constitute the subject-matter of my United States Patents No. 826,487, July 17th, 1906, and No. 840,117, January 1st, 1907, and I therefore make no claim herein specifically to the same, but only to said devices as elements in the combination or entity of the typewriting-machine constituting the subject-matter of the present application.

To shift the spools for different path writing, or for a different ribbon, there is juxtaposed to the slide plate $m^7$, a cam-plate $m^{26}$, the upper portion of which connects with a rod or shaft $m^{27}$ extending transversely across the letter-space carriage and housed by a tube $m^{33}$. The cam-plate $m^{26}$ is provided with a slot $m^{34}$ in which slides a stud $m^{35}$ carried by a bell-crank-lever $m^{36}$ pivoted at $m^{37}$, the second of its members carrying a stud $m^{38}$ operating in a slot $m^{39}$ in the slide-plate $m^7$. Depending from the tubular housing $m^{33}$, is an arm $m^{40}$, connecting at its lower end $m^{41}$ with the slide plate $m^7$.

On the outside of the side-plate $d^5$ is a depending cruciform arm $m^{42}$ rigidly secured to the tube $m^{33}$. Depending in the same relative position, but from shaft $m^{27}$, is an arm $m^{43}$, which carries a stud $m^{44}$ taking into indentations $m^{45}$ in the face of the arm $m^{42}$. The arm $m^{42}$ carries a knob $m^{46}$, and arm $m^{43}$ a knob $m^{47}$ (Fig. 16). When arms $m^{42}$ and $m^{43}$ are in the position illustrated in full lines (in Fig. 16) movement of the arm $m^{42}$ to the position illustrated in dotted lines carries the arm $m^{43}$ with it, thereby moving the tubular portion $m^{33}$ and, thus, arm $m^{40}$ and shifting-plate $m^7$. To bring a different path of ribbon into play, the arm $m^{43}$ is moved to the opposite side of the lever $m^{42}$, and this shifts cam-plate $m^{26}$ and actuates the slide-plate $m^7$. When the feed of the ribbon is reversed, the opposite spool and shifter operate as described.

Depending from and secured to the universal-bar $i^{15}$ is an arm $m^{48}$, connecting at its lower end with a bell-crank-lever $m^{49}$, pivoted at $m^{50}$, toward the upper end of a post $m^{51}$. The other part $m^{52}$ of said bell-crank-lever $m^{49}$ connecting with an arm $m^{53}$ carries a link $m^{54}$, the end of which is pivotally connected to a second link $m^{55}$, pivoted at $m^{56}$, and carrying a ribbon-guide $m^{57}$ designed to carry the ribbon or ribbons. Normally, the ribbon-guide $m^{57}$ is in the position illustrated in Fig. 15, that is, elevated from the platen-surface. Upon movement of the universal-bar $i^{15}$ and at a time when the type-bar is about to descend, the lever $m^{48}$ is operated and this operates the bell-crank-lever $m^{49}$, which, in turn, operates the arm $m^{53}$ and links $m^{54}$ and $m^{55}$ to lower the ribbon-guide $m^{57}$, which thereupon immediately and automatically resumes its normal position by return movement of these parts; permitting visibility of writing. Feeding of the ribbon is momentarily suspended when the type strikes it to prevent wear of the ribbon and filling of the type. The ribbon-guide $m^{57}$ is proportionately moved when the ribbon is moved for path-writing, because it is connected with the ribbon shifter.

Disposed below the ribbon-spools, on hangers $m^{58}$, are idlers $m^{59}$ for guiding and positioning the ribbons when feeding (Fig. 10).

By the peculiar constructions herein combined and by reason of particular disposition thereof, important and novel results accrue; (1) rapidly and easily operating typing mechanism, giving a soft and easy "touch," the speed of the type-bars being peculiarly regulated therefor; (2) the initial power exerted in depressing a key-lever, (by arrangement of the parts and a proper timing of their operation) being sufficient to operate, successively and uniformly, each type-bar, the escapement-mechanism, the ribbon-mechanism, the ribbon-guide, etc., so that full movement of operator's finger for slightly depressing a key-lever is unnecessary to operate the whole series of parts mentioned. Full movement of the key-lever is approximately eleven-sixteenths of an inch: In the first two-sixteenths, movement of the key lever $l^{28}$ and the type-bar lever $l^{27}$ breaks the toggle or locking therefor; in the second sixteenth, the type-bar L moves; in the third sixteenth, the type-head $l^6$ is moving, and the key-lever $l^{28}$ is brought down against the universal-bar, $i^{15}$, the depression of which is seven-sixteenths of an inch. In this seven-sixteenths, and during the first two-sixteenths thereof, a feeding-pawl (not shown) of the ribbon-mechanism contacts with a ratchet-wheel (not shown) and starts movement of the ribbon-mechanism, the ribbon being in a slack condition and moving without friction or resistance. In the second sixteenth, the ribbon-guide $m^{57}$ moves, and starts movement of the lever $i^{12}$ used to operate the letter-spacing dogs; thereupon, movement of the aforementioned ribbon-feeding pawl ceases; in the next two sixteenths, the ribbon-guide $m^{57}$ is lowered to a position below the horizontal plane, where slight resistance is caused by the ribbon drawing taut after its feeding occurs; in the final two-sixteenths of depression, the actuation of the letter-spacing escapement occurs, and the loose dog $i^6$ disengages from rack $i^4$.

The momentum produced by the movement of the key-lever and the gravity of the successive parts effect operation of all parts, including the key-lever, type-bar, ribbon-feeding pawl (simultaneously), and then the ribbon-guide (simultaneously with universal-bar), and produce movement of the letter-spacing mechanism; then the ribbon guide is depressed below the plane of the guiding idlers to carry the ribbon to the printing point; and, finally, but simultaneously, the loose dog disengages from the rack. This principle of operation I term "concatenation," because it involves a series of links of movement, united; that is, a successive series of movements that are connected and depending upon each other, in successively-dependent action.

Short key-levers are herein shown, but the results will be proportionately increased where long levers are employed.

Figs. 10 and 13, illustrate a threaded spindle $G^2$, operated by a knurled disk $G^3$ and connecting with a track-frame G, or platen B, and table-top A, for slightly adjusting or inclining the track-frame, or the platen, tiltably.

Figs. 25 to 35, inclusive, illustrate mechanism for holding and positioning paper and manifolding material on and across the platen, obviating handling of the same.

Fig. 25 illustrates a paper-holding mechanism disposed at the rear of the table. Paper is wound upon one web N rotatably positioned on spindles $n$ secured on uprights $n^2$. One edge $n^3$ is provided with a rack-plate $n^4$ in which meshes a gear-wheel $n^5$ carried by a shaft $n^6$ and operated by beveled-gearing $n^7$ that is actuated by an arm $n^8$ provided with a handle to raise, vertically, the standard $n^2$ and paper-webs N. Any suitable tensioning means for the paper-webs may be utilized to govern the delivery of the paper. One web, only, may, if desired, be used, and be stationary at the back of the writing mechanism.

Webs of manifolding material O are disposed at the side of the platen on spindles $o$ operated by a crank $o^2$ to deliver from the web on one side to a web on the opposite side of the platen.

The particular form of paper-feeding-device and its actuating mechanism, herein shown constitute the subject-matter of another of my United States patents, to-wit, No. 863,056, August 13th, 1907, and I therefore make no claim herein specifically to the same, but only to said devices as elements in the combination or entity of the typewriting machine constituting the subject-matter of the present application.

Figs. 28, 29 and 30 illustrate carbon-holding and lifting mechanism: Herein, continuous carbon strips $q$ are wound upon a spindle P mounted in bracket $p$ back of the platen-hinge. Said strips extend longitudinally over the platen to the carbon-clamp Q which extends transversely across the front of the platen. This clamp holds the end of the carbon strip, and, to insert paper therebetween, these strips are raised by the side rocking arms $q^2$, $q^3$ fulcrumed at $q^4$ and operated by the link $q^5$ and foot-device $q^6$. The clamp $q$ is hinged at $q^7$, and is a split rail that is latched at $q^8$. Connecting with the carbon-clamp Q is a tape-holder $r$, (Fig. 29) vertically slidable on the front part $r^2$ thereof and transversely movable thereon to retain different widths of paper, upon the platen. Secured to the holder is a tape R, preferably flexible and yielding, and disposed on a spindle $r^3$ back of the carbon-spindle P. For transverse movement, the clip $r^4$ slides on top of the clamp Q, and is provided with a knob $r^5$.

Figs. 32 and 33 show a tilting tape-holder S, to which the tape R is attached; it is fulcrumed at $s$; and is operated by a spring $s^2$ when an arm $s^3$ is shifted to remove the holder from contacting with the platen, as shown in Fig. 32.

The particular forms of carbon-holder and lifting mechanism herein shown for the subjects-matter of my United States Patents, No. 826,484, July 17th, 1906, and No 929,837, August 3rd, 1909, and I do not therefore herein specifically claim the same but only as elements in the combination o the typewriting-machine constituting th subject-matter of my present application.

While I have herein described the detail of my invention, it is to be understood tha I do not limit myself to such details excep as the same may be specified in the claims.

Having thus fully described my inventio what I claim as new and desire to secure b Letters-Patent is:—

1. In a typewriter, a tiltable platen, til able track-rails or .rable independent of tl platen and arra: ged t a distance from tl side-edges of the platen to permit independent movement thereof, standards designed to travel upon said track-rails, spacing mechanism housed in the standards, and writing-mechanism suspended between said standards and movable over the platen longitudinally and transversely.

2. In a typewriter, a platen, a track-frame having its side bars arranged at a distance from the side edges of the platen, supports for sustaining said platen and track-frame at the front and rear independent of each other whereby independence of movement of each is facilitated, standards movable upon said track-frame, means housed within the standards for effecting movement thereof longitudinally, and writing-mechanism suspended between the standards and movable over the platen.

3. In a typewriter, a platen, a supporting-member, a track-frame, supports for sustaining said platen and track-frame at the front and rear and independently of each other, whereby independence of movement of each is facilitated, hollow standards movable upon said track-frame, means housed in the standards for effecting movement thereof longitudinally, writing-mechanism suspended between the standards and movable over the platen, and means for effecting intermediate lateral movement of writing-mechanism for letter-spacing.

4. In a typewriter, a platen, a supporting-member, a track-frame, supports for sustaining said platen and track-frame at the front and rear and independently of each other, whereby independence of movement of each is facilitated, hollow standards movable upon said track-frame, means housed in the standards for effecting movement thereof longitudinally, writing-mechanism suspended between the standards and movable over the platen, means for effecting intermediate lateral movement of writing-mechanism for letter-spacing, and means for producing variable longitudinal movement.

5. In a typewriter, a platen, a supporting-member, a track-frame, supports for sustaining said platen and track-frame at the front and rear and independently of each other, whereby independence of movement of each is facilitated, hollow standards movable upon said track-frame, means housed in the standards for effecting movement thereof longitudinally for line-spacing, writing-mechanism suspended between the standards and movable over the platen, and means for effecting intermittent movement thereof, for letter-spacing.

6. In a typewriter, a platen, a supporting member, a track-frame, supports for sustaining said platen and track-frame at the front and rear and independently of each other, whereby independence of movement of each is facilitated, hollow standards movable upon said track-frame, means housed in the standards for effecting movement thereof longitudinally for letter-spacing, writing-mechanism suspended between the standards and movable over the platen, means for effecting intermittent movement thereof for letter-spacing, and means for increasing advance movement thereof.

7. In a typewriter, a platen, a track-frame, supports for sustaining said platen and track-frame at the front and rear and independently of each other, whereby independence of movement of each is facilitated, a supporting-member, hollow standards adapted to travel on the track-frame, self-driving power means for effecting such traveling of the standards on the track-frame for line-spacing, and writing-mechanism suspended between said standards, a carriage on which said writing-mechanism is supported and means operating automatically to effect line-spacing when said carriage is brought back to starting position.

8. In a typewriter, a flat platen, a track-frame, supports for sustaining said platen and track-frame at the front and rear and independently of each other, whereby independence of movement of each is facilitated, hollow standards movable upon the track-frame, self-driving power mechanism housed within the standards, writing-mechanism, means for movably suspending the writing-mechanism between the standards, and a supporting-member underlying the platen and writing-mechanism.

9. In a typewriter, a flat platen, a track-frame, supports for sustaining said platen and track-frame at the front and rear and independently of each other, whereby independence of movement of each is facilitated, hollow standards movable upon the track-frame, self-driving power mechanism housed within the standards, writing-mechanism, means for movably suspending the writing-mechanism between the standards, means for effecting general release of said moving means, and a supporting-member underlying the platen and writing-mechanism.

10. In a typewriter, a flat platen, a track-frame, supports for sustaining said platen and track-frame at the front and rear and independently of each other, whereby independence of movement of each is facilitated, hollow standards movable upon said track-frame, self-driving power mechanism housed within the standards, rails connecting said standards, writing-mechanism suspended upon said rails, and a supporting-member disposed contiguous and in relation to the platen.

11. In a typewriter, a flat platen, a track-frame, supports for sustaining said platen and track-frame at the front and rear and independently of each other, whereby independence of movement of each is facilitated, hollow standards movable upon said track-frame, self-driving power mechanism housed within the standards, rails connecting said standards, writing-mechanism suspended upon said rails, means carried by the writing-mechanism for effecting movement thereof upon said rails, and a supporting-member underlying the writing-mechanism.

12. In a typewriter, a flat platen, a track-frame, supports for sustaining said platen and track-frame at the front and rear and independently of each other, whereby independence of movement of each is facilitated, hollow standards movable upon said track-frame, self-driving power mechanism housed within the standards, rails connecting said standards, a supporting-member, overlying writing-mechanism suspended upon said rails, means carried by the writing-mechanism for effecting movement thereof upon said rails, and means for effecting intermittent movement thereof.

13. In a typewriter, a supporting-member, an overlying platen, track-frame, supports for sustaining said platen and track-frame at the front and rear and independently of each other, whereby independence of movement of each is facilitated, hollow standards traveling on said track-frame, self-driving power mechanism housed within the standards, laterally extending rails connecting said standards, writing-mechanism supported by and movable upon said track-rails, means carried by said writing-mechanism for actuating the same on said rails, and means for effecting general release of said actuating means.

14. In a typewriter, a supporting-member, an overlying platen, track-rails, supports for sustaining the platen and track-rails at front and rear and independently of each other, hollow standards movable upon said track-rails, self-driving-power means housed within the standards for actuating the same, means for effecting general release of the actuating means, transverse rails connecting the standards, writing-mechanism suspended over the rails, means carried by the writing-mechanism for actuating the same upon the rails, and means for effecting general release of the actuating means, whereby positioning of the writing-mechanism over the platen and supporting-member is facilitated.

15. In a typewriter, a platen, an underlying supporting-member, track-rails, supports for sustaining the platen and track-rails at front and rear and independently of each other, standards movable upon said track-rails, self-driving-power means housed within the standards for actuating the same, means for effecting general release of the actuating means, transverse rails connecting the standards, writing-mechanism suspended over the rails, means carried by the writing-mechanism for actuating the same upon the track-rails, means for effecting general release of the actuating means, and a gripping-handle carried by the writing-mechanism whereby positioning of the writing-mechanism over the platen and supporting-member is facilitated.

16. In a typewriter, a platen, track-rails supported and moved independently of said platen, an underlying supporting-member, writing-mechanism movable thereover, means for effecting movement of the writing-mechanism over the platen, a key-board, means arranged adjacent to said key-board and as a member thereof for effecting line-spacing of the writing-mechanism, means for effecting letter-spacing thereof, and means constructed and arranged to vary the extent of movement of the elements constituting the line-spacing and letter-spacing mechanisms.

17. In a typewriter, a flat platen, an underlying supporting-member, overlying track-rails supported and moved independently of said platen, hollow-bodied standards movable upon said track-rails, standard-moving mechanism housed within said standards, writing-mechanism suspended between said standards and overlying the supporting-member, and means for propelling said writing-mechanism between said standards.

18. In a typewriter, a supporting-member, an overlying-flat-platen, track-rails supported and moved independently of said platen, hollow-bodied standards movable upon said track-rails, carriage-self-driving mechanism houesd within the standards, writing-mechanism suspended between said standards, means for propelling said writing mechanism between said standards, and means for regulating such propulsion thereof.

19. In a typewriter, the combination with a tiltable and transversely-shiftable flat platen, of tiltable track-rails disposed remote from the edges of the platen and extending to the rear of their pivots, means engaging said track-rails for effecting a tilting movement thereof, clamping-members carried by one of said elements, a book-support underlying said platen, writing-mechanism to traverse said track-rails and adapted to occupy a position on the portion of the track-rails to the rear of the hinging of the platen and permitting adjustment of the book on its support and, also, the adjustment and clamping of the page on the platen without disturbing the rails.

20. In a typewriter, a platen, an underlying support, track-rails mounted thereover, a line-spacing carriage adapted to traverse said track-rails, mechanism for actuating said carriage, a letter-space carriage supported by and traveling on said line-spacing carriage, spacing mechanism carried thereby, a line-spacing-carriage-releasing-device carried by said letter-space carriage, a letter-space-carriage-releasing-device also carried by said letter-space carriage and operatively associated with the line-spacing-carriage-releasing-device, and a gripping-member mounted on said letter-space-releasing-devices and whereby positioning of said carriages over the platen and the underlying support is facilitated.

21. In a typewriter, the combination with a work-support, track-rails, a work-holding element, and means including a foot-operated device for changing the relation between the work-support and the work-holding element, whereby a work-sheet may be positioned between the work-support and the work-holding element.

In testimony whereof, I affix my signature, in the presence of two subscribing witnesses.

GEORGE W. DONNING.

Witnesses:
EDMUND H. PARRY,
HOWARD W. FORSYTH.

Copies of this patent may be obtained for five cents each, by addressing the "Commissioner of Patents, Washington, D. C."